United States Patent [19]
Kaes

[11] 3,888,685
[45] June 10, 1975

[54] SENSITIZED, SILVER-ACTIVATED, PHOSPHORUS PENTOXIDE-CONTAINING RADIO-PHOTOLUMINESCENT GLASS AND PROCESS OF MAKING SAME

[75] Inventor: Hans-Herbert Kaes, Wetzlar; Dorlar, Germany

[73] Assignee: Ernst Leitz GmbH, Wetzlar, Germany

[22] Filed: Mar. 27, 1973

[21] Appl. No.: 345,368

[30] Foreign Application Priority Data
Apr. 1, 1972 Germany............................ 2216064

[52] U.S. Cl.... 106/47 R; 252/301.4 P; 252/301.4 F
[51] Int. Cl............................................ C03c 3/26
[58] Field of Search.................... 106/47 R, 47 Q; 252/301.4 P, 301.4 F; 250/83.1

[56] References Cited
UNITED STATES PATENTS
2,524,839  10/1950  Schulman et al............. 252/301.4 P 3,740,241  6/1973  Brömer et al.................... 252/301.4
3,751,272  8/1973  Izvmitani et al. ................ 106/47 R FOREIGN PATENTS OR APPLICATIONS
44-4202   2/1969  Japan.............................. 106/47 R
1,516,353 1/1968  France Primary Examiner—Winston A. Douglas
Assistant Examiner—John F. Niebling
Attorney, Agent, or Firm—Erich M. H. Radde

[57] ABSTRACT

An improved highly sensitized, silver-activated, phosphorus pentoxide-containing radio-photoluminescent glass of optimum sensitivity and predose value contains at least one of the elements selected from the group consisting of arsenic, zirconium, cerium, cesium, platinum, antimony, germanium, tin, hafnium, and titanium in a concentration of 0.0001 to 0.1 percent, by weight. Melting of the glass components is preferably effected in a slightly oxidizing atmosphere. The improved glasses are useful as dosimeter glasses especially in instruments for integrating dosimetry.

10 Claims, 1 Drawing Figure

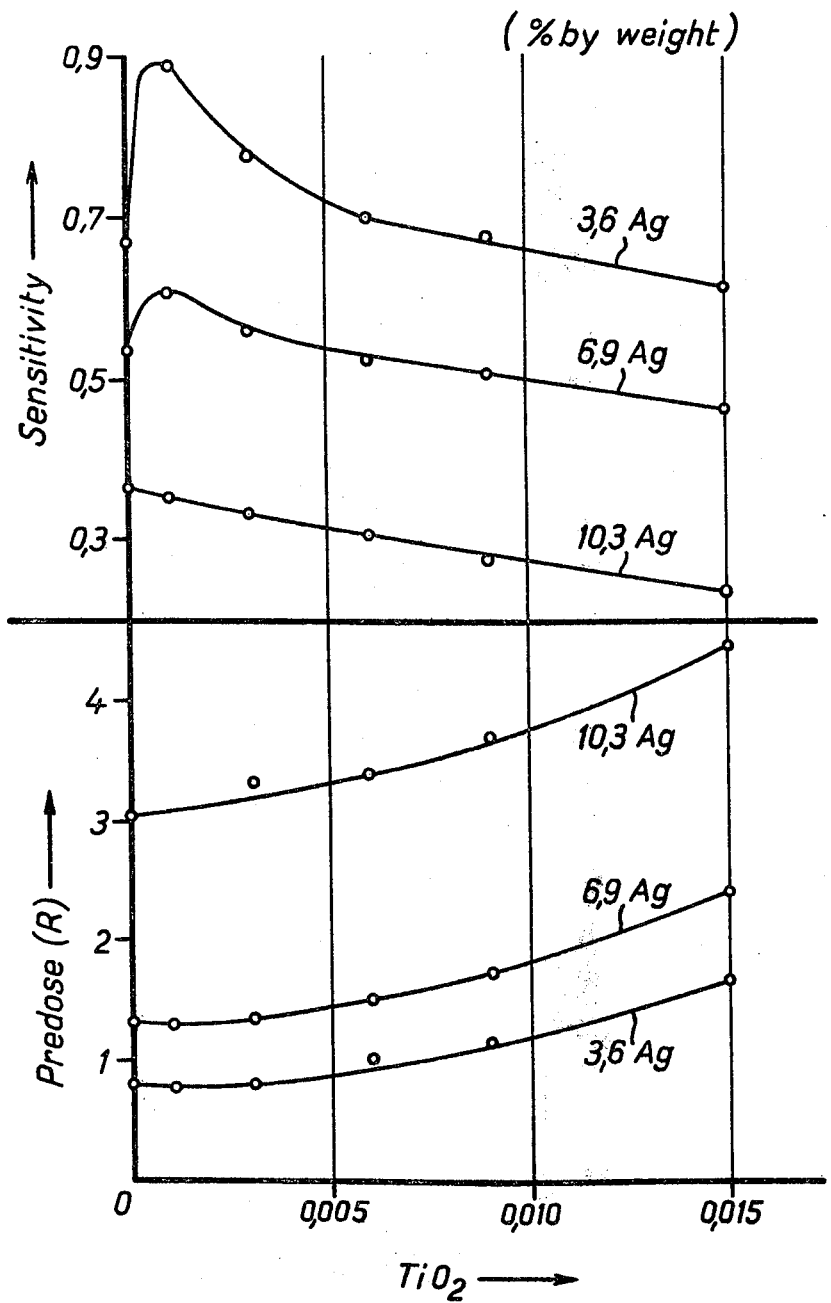

SENSITIZED, SILVER-ACTIVATED, PHOSPHORUS PENTOXIDE-CONTAINING RADIO-PHOTOLUMINESCENT GLASS AND PROCESS OF MAKING SAME

BACKGROUND OF THE INVENTION

1. Field of the Invention

The present invention relates to improved sensitized, silver-activated, phosphorus pentoxide-containing radio-photoluminescent glasses, to a process of manufacturing same, and to instruments containing same.

2. Description of the Prior Art

The sensitivity of radio-photoluminescent glasses depends — as all dose metering properties — on the composition of the glass, its silver concentration, and the melting and tempering technique of its manufacture (see, for instance, K. Becker in "Health Physics" vol. 14, (1968), p. 17). An increase in sensitivity by varying these parameters, which higher sensitivity is desirable for many purposes of use, frequently affects and substantially changes the other properties of such a glass in an undesired manner.

Thus it is known, for instance, from K. Becker in "Nuclear Instruments and Methods" vol. 36, (1965), p. 323, that glasses of a high sensitivity have low resistance to weathering and that a silver content sufficient to achieve optimum sensitivity, at the same time determines the kinetics of the radio-photoluminescence and the $\gamma$-energy dependence (see, for instance, K. Becker in "Health Physics" vol. 14, (1968), p. 17).

Thus the possibility of improving the sensitivity could be obtained heretofore only at the cost of an impairment or, respectively, of an undesired change in other dose metering properties. As a result thereof it is questionable whether such a glass can be used as dosimeter glass.

SUMMARY OF THE INVENTION

It is one object of the present invention to provide an improved highly sensitized, silver-activated, phosphorus pentoxide-containing radio-photoluminescent glass which is free of the disadvantages of the known radio-photoluminescent glasses and the sensitivity of which is substantially higher than that of such known glasses.

Another object of the present invention is to provide a simple and effective process of producing such improved highly sensitized, silver-activated, phosphorus pentoxide-containing radio-photoluminescent glasses.

Other objects of the present invention and advantageous features thereof will become apparent as the description proceeds (see also, for instance K. Becker in "Health Physics" Vol. 14, (1968), pp. 17 – 32; H.-J. Hardt in "Atompraxis" Vol. 12, (1966), pp. 135 – 140; E. Piesch in "GIT, Fachzeitschrift fuer das Laboratorium" Vol. 15, (1971), pp. 1239 – 1246).

In principle these objects of the present invention are achieved by providing a silver-activated, phosphorus pentoxide-containing glass which additionally contains at least one of the elements arsenic, zirconium, cerium, cesium, platinum, antimony, germanium, tin, hafnium, and titanium in a concentration of 0.0001 to 0.1 percent, by weight, calculated as oxide. A glass which contains titanium in a concentration of 0.001 to 0.003 percent, by weight, calculated as dioxide, is especially useful.

The process of the present invention for producing such sensitized radio-photoluminescent glasses consists in melting the glass down from a glass component mixture of known composition into which at least one oxide of the elements arsenic, zirconium, cerium, cesium, antimony, germanium, tin, hafnium and/or titanium is incorporated up to a concentration of 0.1 percent, by weight. Addition or doping of the mixture of glass components can be effected also by the addition of at least one halide, preferably a fluoride or a chloride of the elements arsenic, zirconium, cerium, cesium, antimony, germanium, tin, hafnium, platinum, and/or titanium up to a concentration of 0.1 percent, by weight, or by the addition of at least one nitrate of the elements cerium, cesium, and/or tin up to a concentration of 0.1 percent, by weight.

It is particularly advantageous to melt the doped mixture in a slightly oxidizing atmosphere.

Surprisingly it has been found that upon sensitizing by such doping, aside from the desired increase in sensitivity, merely the predose of ionizing radiation is changed. Thus it is now possible by specific doping to obtain optimum sensitivity and predose values.

DESCRIPTION OF THE PREFERRED EMBODIMENTS

The glasses according to the present invention and their properties as well as their manufacture will be described hereinafter more in detail without, however, being limited thereto.

Example 1

A known base glass consists, for instance, of 6.9 percent, by weight, of silver Ag, 41.6 percent, by weight, of lithium metaphosphate $LiPO_3$, and 51.5 percent, by weight, of aluminum metaphosphate $Al(PO_3)_3$.

This specific base glass composition corresponds in principle to the glass compositions developed, for instance, by R. Yokota et al. (French Pat. No. 1,516,353) or by S. Carpentier et al. (German Pat. No. 1,596,750).

In the following Table the effect of the doping element, calculated as oxide, and its concentration on the

TABLE

| Added Element | A. Sensitivity in arbitrary units Concentration of added element in %, by weight | | | | | B. Predose values in Roentgen Concentration of added element in %, by weight | | | | |
|---|---|---|---|---|---|---|---|---|---|---|
| | 0.001 | 0.003 | 0.006 | 0.009 | 0.015 | 0.001 | 0.003 | 0.006 | 0.009 | 0.015 |
| Ti | 0.61 | 0.56 | 0.53 | 0.46 | 0.41 | 1.32 | 1.35 | 1.52 | 1.73 | 2.30 |
| Ge | 0.54 | 0.54 | 0.54 | 0.56 | 0.57 | 1.33 | 1.42 | 1.63 | 1.88 | 2.85 |
| As | 0.55 | 0.56 | 0.56 | 0.56 | 0.56 | 1.32 | 1.43 | 1.45 | 1.45 | 1.48 |
| Zr | 0.54 | 0.55 | 0.55 | 0.56 | 0.56 | 1.34 | 1.39 | 1.41 | 1.47 | 1.52 |
| Sn | 0.55 | 0.57 | 0.57 | 0.58 | 0.60 | 1.32 | 1.67 | 1.90 | 2.42 | 3.34 |
| Sb | 0.54 | 0.54 | 0.55 | 0.57 | 0.56 | 1.33 | 1.45 | 1.46 | 1.46 | 1.49 |
| Cs | 0.53 | 0.53 | 0.56 | 0.56 | 0.55 | 1.28 | 1.28 | 1.27 | 1.30 | 1.28 |
| Ce | 0.53 | 0.53 | 0.55 | 0.55 | 0.54 | 1.35 | 1.53 | 1.67 | 1.55 | 1.58 |
| Hf | 0.54 | 0.56 | 0.56 | 0.57 | 0.56 | 1.33 | 1.43 | 1.58 | 1.70 | 1.88 |
| Pt | 0.53 | 0.55 | 0.56 | 0.55 | 0.56 | 1.32 | 1.38 | 1.42 | 1.43 | 1.52 | change in sensitivity, measured in arbitrary units, is listed under A and the effect of the doping element and its concentration on the change in the predose value, measured in Roentgen, is listed under B.

Of course, elements which, due to their intrinsic luminescence, strongly increase the predose value and/or which by their intrinsic color in small concentration decrease the sensitivity and/or which by their radioactive properties render impossible the use of the glass, for instance, in dosimetric tests with humans, should not be used as additives.

The sensitivity values given in the Table depend upon the evaluation method used. In particular, the form, the surface treatment, and the encapsulation of the dosimeter glasses and also the construction of the evaluation instrument, are of prime importance in determining the measured values (see, for instance, E. Piesch in "Direct Information 17/64" (1964) of the European Society for Radiation Protection). Therefore, the sensitivity is given in the Table in arbitrary units as a relative number, namely relative to a known, highly sensitive laboratory glass. Said laboratory glass has a relative sensitivity of 0.54 ± 0.005 and a predose value of 1.32 ± 0.009 R. The error in the measured values indicated in the Table is ± 0.008 (arbitrary units) with respect to the sensitivity and ± 0.15 R with respect to the predose values.

The Table shows that addition of the elements arsenic, zirconium, cerium, cesium, and platinum has only a slightly sensitizing effect, while that of antimony, germanium, tin, and hafnium causes stronger sensitization, i.e., they all increase the sensitivity.

Surprisingly titanium assumes a special position. In the concentration range of its addition between 0.001 and 0.003 percent, by weight, calculated as dioxide, this element exerts a substantial sensitizing effect, while in concentrations above 0.003 percent, by weight, it impairs this specific dosimeter property. It is furthermore surprising that the predose values increase only slightly from 1.32 R to 1.35 R in the preferred concentration range of 0.001 to 0.003 percent, by weight. Due to this negligible increase of the predose value in the preferred sensitizing concentration range of the added element, titanium is particularly suited for practical use.

The effect of the added elements on the changes in sensitivity and on the predose values is not dependent on the composition of the base glass used. For instance, the base glass composition can be varied on the one hand, by maintaining constant the amount of silver in the glass but varying the ratio of lithium to aluminum and, on the other hand, by replacing 10 percent, by weight, of lithium metaphosphate $LiPO_3$ by magnesium or calcium metaphosphate $Mg(PO_3)_2$ or $Ca(PO_3)_2$. Thereby, it was found that variations in the composition of the base glass do not have any essential effect on the optimum concentration of the added element and that, in addition thereto, the percentage increase in sensitivity remains constant in first approximation.

In another series of tests, the above mentioned base glass having different amounts of silver and titanium dioxide $TiO_2$ was melted. The sensitivity of such a glass is plotted in the upper part of the attached Graph, while the predose values are plotted in the lower part thereof as a function of the added titanium dioxide concentration for three phosphate glasses having silver contents of 3.6 percent, by weight, 6.9 percent, by weight, and 10.3 percent, by weight, respectively.

The curves show that the sensitizing effect increases with a decrease in the silver content. Maximum sensitization is achieved with an added titanium dioxide concentration of 0.001 percent, by weight.

The curves illustrating the predose values as a function of the titanium dioxide addition are of the same type for all three percentages of silver present in the base glass. They are approximately constant in the optimum range of sensitization from 0.001 to 0.003 percent, by weight, of titanium dioxide.

Doping of the glass composition mixtures from which the glasses of the present invention are produced by melting is effected by the addition of one or more of the respective elements in the form of their halides, particularly as their fluorides or chlorides; or in the form of their oxides or nitrates. It may again be pointed out that the base glass can be any known silver-activated phosphate glass. The base glass may also differ from known dosimeter glasses of this type with respect to its proportions in percent.

Especially purified glass components are melted in a closed quartz crucible placed in an electric furnace in a slightly oxidizing atmosphere which should preferably be maintained during the entire melting time. Of course, the use of other technically equivalent crucible materials and/or melting furnaces lies also within the scope of the present invention.

The glasses sensitized by the addition according to the present invention are preferably used as radio-photoluminescent dosimeter glasses for integrating dosimetry, i.e., for the additive recording of any desired sequences of radiation doses independently of the time distribution of the dose.

I claim:
1. A sensitized, silver-activated, phosphorus pentoxide-containing radio-photoluminescent glass containing one of the elements selected from the group consisting of arsenic, zirconium, cerium, cesium, platinum, antimony, germanium, tin, hafnium, and titanium in a concentration of 0.0001 to 0.1 percent, by weight, calculated as oxide.

2. The glass of claim 1 containing the added element in a concentration of 0.001 to 0.003 percent, by weight, calculated as oxide.

3. The glass of claim 1 containing the added element in a form selected from the group consisting of its oxide, halide, and nitrate.

4. The glass of claim 1, containing an oxide of an element selected from the group consisting of arsenic, zirconium, cerium, cesium, antimony, germanium, tin, hafnium, and titanium in a concentration of 0.0001 to 0.1 percent, by weight.

5. The glass of claim 1 containing a halide of an element selected from the group consisting of arsenic, zirconium, cerium, cesium, platinum, antimony, germanium, tin, hafnium, and titanium in a concentration of 0.0001 to 0.1 percent, by weight, calculated as oxide.

6. The glass of claim 1 containing a nitrate of an element selected from the group consisting of cerium, cesium, and tin in a concentration of 0.0001 to 0.1 percent, by weight, calculated as oxide.

7. The glass of claim 5, in which the halide is the fluoride of the added element.

8. The glass of claim 5, in which the halide is the chloride of the added element.

9. A sensitized, silver-activated, phosphorus pentoxide-containing radio-photoluminescent glass of improved sensitivity, said glass containing titanium dioxide in a concentration of 0.0001 to 0.1 percent, by weight.

10. The glass of claim 9, containing titanium dioxide in a concentration of 0.001 to 0.003 percent, by weight.

* * * * *